3,235,458
PROCESS FOR PREPARING AN ALUMINUM SULFATE-ALUMINUM CHLORHYDRATE ANTIPERSPIRANT CREAM
Ralph Paul Messina, Somerset, N.J., assignor to Colgate-Palmolive Company, New York, N.Y., a corporation of Delaware
No Drawing. Filed Aug. 22, 1962, Ser. No. 218,501
1 Claim. (Cl. 167—90)

This invention relates to cosmetic compositions and more particularly to improvements in emulsified antiperspirant cosmetic creams.

Cosmetic preparations which have a perspiration inhibiting or retarding effect are well known. Among the most preferred types of such preparations are the antiperspirants of the so-called "vanishing cream" type. These are generally oil-in-water emulsions containing an astringent, the latter usually being an aluminum salt of a strong inorganic acid, e.g. hydrochloric, sulfuric acid and the like.

In the course of my research, I have discovered a unique formulation for, and means of preparation of, an emulsified antiperspirant cosmetic cream which provides superior antiperspirant effectiveness and is substantially noncorrosive to fabrics. However, of even greater importance, my cream possesses a smooth, firm, uniformly emulsified texture which is manifestly superior both visually and tactually to present commercial antiperspirant cosmetic creams, and which possesses a consistency which inhibits the exudation of liquid material even after consumer receptacles containing the cream are stored in sidewise fashion for extended periods of time.

In addition, I have found that my cream has improved penetrability and, surprisingly, does not have a sticky after-effect upon application to the skin.

According to this invention, an emulsified antiperspirant cosmetic cream preparation comprises a stearic acid ester of an aliphatic diol containing 2 to 4 carbon atoms; a polyethylene glycol ether of a fatty alcohol, said ether having a molecular weight of between about 900 and about 1400; water; a sulfated anionic organic emulsifier; and a mixture of aluminum sulfate and aluminum chlorhydrate in an amount sufficient to act as an astringent for said preparation.

The inventive preparation is an emulsion of a fatty (oil) phase dispersed in an aqueous phase, the fatty phase being primarily the stearic acid ester and the glycol ether, although an emollient oil, such as mineral oil or petrolatum, is also usually present. In general, the fatty phase should be present in amounts of from about 12 to about 30 percent by weight of the preparation. For the practice of this invention, a particularly desirable cream is obtained when the ester employed is ethylene glycol monostearate and the ether employed is a polyethylene glycol ether of a higher fatty alcohol containing from 16 to 18 carbon atoms and wherein the ethoxylation of the ether is effected by 20 to 25 moles of ethylene oxide.

Illustrative of the sulfated anionic organic emulsifiers useful in the practice of this invention are sodium lauryl sulfate, sodium cetyl sulfate, and triethanolamine lauryl sulfate. Of these, sodium lauryl sulfate has been found to be particularly desirable in the preferred embodiment of this invention. The amount of emulsifier is not narrowly critical but is determined by practicality. However, this range for the practice of this invention has been found to lie within about 2 to about 6 percent by weight of the preparation.

The amount of astringent, i.e. aluminum sulfate and aluminum chlorhydrate, is also determined by practical considerations. However, for the practice of this invention, it has been found desirable for the salts to be present in amounts of from about 10 to about 25 percent of the preparation. Within this range, the individual salts should comprise, for optimum results, between about 5 and about 20 percent by weight of the total preparation.

Aluminum chlorhydrate is a known water-soluble antiperspirant ingredient and has been referred to as aluminum chlorhydroxide complex and basic aluminum chloride. In general, it has an approximate atomic ratio of aluminum to chlorine of 2:1 (e.g. 2.1 to 1.9:1) and an empirical formula of $Al_2(OH)_5Cl$ in aqueous solution.

In the antiperspirant preparation of this invention, there also will usually be found a humectant and a fabric corrosion inhibitor. Illustrative of the former are sorbitol, glycerine and propylene glycol. Illustrative of the fabric corrosion inhibitors are nitrogen-containing compounds such as glycine and urea. For the practice of this invention, sorbitol in amounts of from about 2 to about 12 percent by weight, and glycine in amounts of from about 1 to about 6 percent by weight are preferred. Suitable other ingredients normally found in antiperspirant cream preparations can also be included in the preparations of this invention. These include perfume, and opacifiers and whiteners such as titanium oxide. Of course, water, the continuous phase, is also present, usually in amounts of from about 30 to about 70 percent by weight.

A specific preferred embodiment of my inventive preparation can also include a deodorant such as hexachlorophene in amounts sufficient to effect definitive deodorant activity. Minor amounts of an iron complexing agent such as ethylene diamine tetraacetic acid or the alkali salts thereof to prevent discoloration of the product can also be included in the inventive preparations.

A particularly preferred antiperspirant cream preparation comprises, in combination, from about 10 to about 20 percent by weight ethylene glycol monostearate, from about 2 to about 8 percent by weight of a polyethylene glycol ether of a higher fatty alcohol wherein said alcohol contains from 16 to 18 carbon atoms and wherein the ethoxylation of said ether is effected by 20 to 25 moles of ethylene oxide, from about 30 to about 70 percent by weight water, from about 1 to about 6 percent by weight of mineral oil or petrolatum, from about 2 to about 12 percent by weight of sorbitol, glycerine or propylene glycol, from about 2 to about 6 percent by weight of sodium lauryl sulfate, from about 2 to about 8 percent by weight of urea or about 1 to about 6 percent glycine, and a mixture of aluminum sulfate and aluminum chlorhydrate, each of said aluminum salts being in amounts of from about 5 to about 20 percent by weight of the preparation, with the total amount of said salts being from about 10 to about 25 percent of the cream preparation.

The manner of preparation of the formulations of this invention is a critical feature of my invention. Heretofore, the astringent has been usually added during the cooling cycle. In the preparation of my formulations, however, the astringent, i.e., the aluminum sulfate and aluminum chlorhydroxide complex, is added to the emulsion during the making thereof while the latter is hot. A typical cycle of preparation is as follows:

A. The fatty phase is heated to a temperature of between about 160 and 200° F. (preferably about 190° F.).

B. The emulsifying phase (emulsifier plus water) is heated to approximately the same temperature as the fatty phase and is added thereto thereby forming an emulsion.

C. The aluminum sulfate is then added to the hot emulsion followed by an aluminum chlorhydrate solution which is preheated to a temperature of about 160° F. before addition to the hot emulsion.

D. The astringent-containing emulsion is then heated to a temperature of between about 195° F. and 200° F., with agitation, and then cooled to about 120° F.

The fabric corrosion inhibitor may be added along with the astringent, or after the cooling stage. However the addition of a solution of the inhibitor, preheated to a temperature of about 185° F., along with the astringent is preferred. After the cooling step of stage D above, the perfume may be added, the mixture cooled to a temperature of about 105° C., and then passed through a colloid mill. Additives such as titanium dioxide, hexachlorophene and ethylene diamine tetraacetic acid are usually included in the first stage, i.e. stage A above.

For best results, the consumer receptacles enclosing the inventive preparations should be filled in any of the following ways:

(1) The cream can be milled at a temperature of between about 117 and about 122° F. (preferably about 120° F.), immediately placed in jars, etc., and allowed to cool therein.

(2) The cream can be placed at ambient temperature into jars and the jars then placed in a conditioning chamber to elevate the cream temperature to about 120° F., and then cooled.

(3) The cream can be pumped through a heat exchanger to warm the cream to a temperature of about 120° F., immediately placed into jars, and then cooled.

Filling according to any one of the three alternatives listed above has been found desirable for the inventive preparations in order to prevent the exudation of liquid material when the consumer receptacles, e.g., jars and the like, are stored on their side. This is a serious problem since most antiperspirant cream packages are designed for side storage display.

The following examples will further illustrate the scope and practice of this invention. However, it is to be understood that they are purely by way of illustration and are not to be considered in any way as a limitation of the scope of the compositions forming the subject invention. Except as otherwise indicated, the proportions and percentages employed are by weight.

*Example I*

A mixture of 1395 parts of ethylene glycol monostearate, 405 parts of a polyethylene glycol ether of mixed fatty alcohols having from 16 to 18 carbon atoms, the ethoxylation of said ether being effected by about 20 moles of ethylene oxide, 315 parts of mineral oil, 585 parts of sorbitol, 45 parts of titanium dioxide, 22.5 parts of hexachlorophene and 9 parts of the disodium salt of ethylene diamine tetraacetic acid, is heated to a temperature of about 190° F. To this mixture is then added, with agitation, a solution of 360 parts of sodium lauryl sulfate in 2755 parts of water, said solution having been preheated to a temperature of about 190° F.

Aluminum sulfate (990 parts) is then added slowly to the hot emulsion. 990 parts of aluminum chlorhydroxide complex (50% solution), preheated to about 160° F., are also added immediately thereafter. At the same time, 315 parts of glycine (dissolved in 900 parts of water) are also added. The resulting mixture is then heated to a temperature of about 195° F. under agitation, and thereupon cooled to about 120° F.

Perfume is then added, and the composition cooled to a temperature of about 105° F. and passed through a colloid mill.

The formulation obtained can be expressed as follows.

Formula ingredients: Percent
Ethylene glycol monostearate _____ 15.5
Polyethylene glycol ether of mixed
 fatty alcohols _____ 4.5
Mineral oil _____ 3.5
Sorbitol _____ 6.5
$TiO_2$ _____ 0.5
Hexachlorophene _____ 0.25
Disodium salt of ethylene diamine
 tetraacetic acid _____ 0.10
Sodium lauryl sulfate _____ 4.0
Aluminum sulfate (hydrate) _____ 11.0
Aluminum chlorhydroxide complex
 (50% solution) _____ 11.0
Glycine _____ 3.5
Perfume _____ 0.15
Water, balance to 100.

Other formulations illustrating the compositions of this invention include—

*Example II*

Formula ingredients: Percent
Ethylene glycol monostearate _____ 12.0
Polyethylene glycol ether of mixed
 fatty alcohols (as in Example I) _____ 6.0
Petrolatum _____ 2.0
Sorbitol _____ 2.0
Sodium lauryl sulfate _____ 4.0
Titanium dioxide _____ 0.5
Aluminum sulfate (hydrate) _____ 12.0
Aluminum chlorhydroxide complex
 (50% solution) _____ 8.0
Perfume _____ 0.15
Water to 100 percent.

*Example III*

Formula ingredients: Percent
Ethylene glycol monostearate _____ 10.0
Diethylene glycol monostearate _____ 4.0
Polyethylene glycol ether of mixed higher fatty
 alcohols, the ethoxylation being effected by
 about 25 moles of ethylene oxide _____ 4.0
Mineral oil _____ 5.0
Sorbitol _____ 3.5
Sodium lauryl sulfate _____ 3.0
Hexachlorophene _____ 0.2
Ethylene diamine tetraacetic acid _____ 0.1
Aluminum sulfate (hydrate) _____ 13.0
Aluminum chlorhydroxide complex (50% solution) _____ 10.0
Perfume _____ 0.10
Water to 100 percent.

*Example IV*

Formula ingredients:
Ethylene glycol monostearate _____ 15.0
Polyethylene glycol ether of mixed fatty alcohols (as in Example III) _____ 5.0
Mineral oil _____ 3.0
Propylene glycol _____ 5.0
Sodium lauryl sulfate _____ 2.5
Titanium dioxide _____ 1.0
Aluminum sulfate (hydrate) _____ 10.0
Aluminum chlorhydroxide complex (50% solution) _____ 10.0
Glycine _____ 2.5
Perfume _____ 0.2
Water to 100 percent.

*Example V*

Formula ingredients:
Ethylene glycol monostearate _____ 13.5
Polyethylene glycol ether of mixed fatty alcohols (as in Example I) _____ 4.5
Petrolatum _____ 2.0
Glycerine _____ 3.5
Sorbitol _____ 2.0
Sodium lauryl sulfate _____ 3.5
Hexachlorophene _____ 0.1
Ethylene diamine tetraacetic acid _____ 0.1
Titanium dioxide _____ 0.4
Aluminum sulfate (hydrate) _____ 15.0
Aluminum chlorhydroxide complex (50% solution) _____ 7.0
Perfume _____ 0.15
Water to 100 percent.

*Example VI*

Formula ingredients:
| | |
|---|---|
| Ethylene glycol monostearate | 14.0 |
| Polyethylene glycol ether of mixed fatty alcohols (as in Example I) | 3.5 |
| Petrolatum | 3.0 |
| Sorbitol | 4.0 |
| Triethanolamine lauryl sulfate | 5.5 |
| Titanium dioxide | 0.5 |
| Aluminum sulfate (hydrate) | 11.0 |
| Aluminum chlorhydroxide complex (50% solution) | 11.0 |
| Glycine | 2.5 |
| Perfume | 0.1 |

Water to 100 percent.

*Example VII*

Formula ingredients:
| | |
|---|---|
| Ethylene glycol monostearate | 10.0 |
| Diethylene glycol monostearate | 2.0 |
| Diethylene glycol distearate | 2.0 |
| Polyethylene glycol ether in mixed fatty alcohols (as in Example III) | 3.75 |
| Propylene glycol | 1.5 |
| Sorbitol | 3.0 |
| Sodium lauryl sulfate | 3.5 |
| Hexachlorophene | 0.15 |
| Titanium dioxide | 0.7 |
| Ethylene diamine tetraacetic acid | 0.10 |
| Aluminum sulfate | 10.5 |
| Aluminum chlorhydroxide complex (50% solution) | 9.5 |
| Glycine | 2.0 |
| Perfume | 0.25 |

Water to 100 percent.

Although the present invention has been described with reference to particular embodiments and examples, it will be apparent to those skilled in the art that variations and modifications of this invention can be made without departing from the principles and true spirit of the invention.

What is claimed is:

A process for the preparation of an emulsified antiperspirant cream preparation which comprises adding, at an elevated temperature of between about 160 and 200° F., an emulsifying phase comprising a solution of a sulfated anionic organic emulsifier in water to a fatty phase comprising a stearic acid ester of an aliphatic diol containing 2 to 4 carbon atoms and a polyethylene glycol ether of a fatty alcohol, said ether having a molecular weight of between about 900 and about 1400, and thereupon adding, at said elevated temperature, a preheated astringent comprising a mixture of aluminum sulfate and aluminum chlorhydrate in an amount sufficient to act as an astringent for said preparation, and thereupon cooling the product formed.

References Cited by the Examiner

UNITED STATES PATENTS

| 2,236,387 | 3/1941 | Wallace et al. | 167—90 |
| 2,492,085 | 12/1949 | Anderson | 167—90 |
| 2,854,382 | 9/1958 | Grad | 167—90 |
| 2,889,253 | 6/1959 | Berger | 167—90 |

FOREIGN PATENTS 656,748  8/1951  Great Britain.

OTHER REFERENCES

Sagarin: Cosmetics, Science and Technology, Interscience Publishers, New York, N.Y. (1957), pp. 159, 167, 404–405, 657, 721, 724–729 and 775.

Hadgraft: Journal of Pharmacy and Pharmacology, vol. 6, No. 2, pp. 816–829, pp. 816–817 relied on (1954).

JULIAN S. LEVITT, *Primary Examiner.*